US007190280B2

(12) United States Patent
Hall et al.

(10) Patent No.: US 7,190,280 B2
(45) Date of Patent: Mar. 13, 2007

(54) METHOD AND APPARATUS FOR TRANSMITTING AND RECEIVING DATA TO AND FROM A DOWNHOLE TOOL (75) Inventors: David R. Hall, Provo, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 227 days.

(21) Appl. No.: 10/250,245

(22) Filed: Jun. 17, 2003

(65) Prior Publication Data
US 2004/0150532 A1 Aug. 5, 2004

Related U.S. Application Data (60) Provisional application No. 60/444,100, filed on Jan. 31, 2003.

(51) Int. Cl.
*E21B 47/16* (2006.01)
(52) U.S. Cl. .................... 340/855.1; 175/40
(58) Field of Classification Search ............. 175/40, 175/104; 340/854.9, 855.1, 855.3, 854.3, 340/854.8
See application file for complete search history.

(56) References Cited

U.S. PATENT DOCUMENTS

| 0,749,633 | A | 1/1904 | Seeley |
| 2,178,931 | A | 11/1939 | Crites et al. |
| 2,197,392 | A | 4/1940 | Hawthorn |
| 2,249,769 | A | 7/1941 | Leonardon |
| 2,301,783 | A | 11/1942 | Lee |
| 2,354,887 | A | 8/1944 | Silverman et al. |
| 2,379,800 | A | 7/1945 | Hare |
| 2,414,719 | A | 1/1947 | Cloud |
| 2,531,120 | A | 11/1950 | Feaster |
| 2,633,414 | A | 3/1953 | Boivinet |
| 2,659,773 | A | 11/1953 | Barney |
| 2,662,123 | A | 12/1953 | Koenig, Jr. |
| 2,748,358 | A | 5/1956 | Johnston |
| 2,974,303 | A | 3/1961 | Dixon |
| 2,982,360 | A | 5/1961 | Morton et al. |
| 3,079,549 | A | 2/1963 | Martin |

(Continued)

FOREIGN PATENT DOCUMENTS

| EP | 0399987 A1 | 11/1990 |
| WO | W8801096 | 2/1988 |
| WO | WO9014497 | 11/1990 |

*Primary Examiner*—David Bagnell
*Assistant Examiner*—Daniel P Stephenson
(74) *Attorney, Agent, or Firm*—Jeffery E. Daly (57) ABSTRACT A transmission line network system for transmitting and/or receiving data from a downhole tool. The invention is achieved by providing one or more transceiving elements, preferably rings, at either end of a downhole tool. A conduit containing a coaxial cable capable of communicating an electrical signal is attached to the transceiving element and extends through a central bore of the downhole tool and through the central bore of any tool intermediate the first transceiving element and a second transceiving element. Upon receiving an electrical signal from the cable, the second transceiving element may convert such signal to a magnetic field. The magnetic field may be detected by a third transceiving element in close proximity to the second transceiving element. In this manner, many different tools may be included in a downhole transmission network without requiring substantial modification, if any, of any particular tool.

67 Claims, 9 Drawing Sheets

U.S. PATENT DOCUMENTS

| | | |
|---|---|---|
| 3,090,031 A | 5/1963 | Lord |
| 3,170,137 A | 2/1965 | Brandt |
| 3,186,222 A | 6/1965 | Martin |
| 3,194,886 A | 7/1965 | Mason |
| 3,209,323 A | 9/1965 | Grossman, Jr. |
| 3,227,973 A | 1/1966 | Gray |
| 3,253,245 A | 5/1966 | Brandt |
| 3,518,608 A | 6/1970 | Papadopoulos |
| 3,696,332 A | 10/1972 | Dickson, Jr. et al. |
| 3,793,632 A | 2/1974 | Still |
| 3,807,502 A | 4/1974 | Heilhecker et al. |
| 3,879,097 A | 4/1975 | Oertle |
| 3,930,220 A | 12/1975 | Shawhan |
| 3,957,118 A | 5/1976 | Barry et al. |
| 3,989,330 A | 11/1976 | Cullen et al. |
| 4,012,092 A | 3/1977 | Godbey |
| 4,087,781 A | 5/1978 | Grossi et al. |
| 4,095,865 A | 6/1978 | Denison et al. |
| 4,121,193 A | 10/1978 | Denison |
| 4,126,848 A | 11/1978 | Denison |
| 4,215,426 A | 7/1980 | Klatt |
| 4,220,381 A * | 9/1980 | van der Graaf .......... 340/853.7 |
| 4,348,672 A | 9/1982 | Givler |
| 4,445,734 A | 5/1984 | Cunningham |
| 4,496,203 A | 1/1985 | Meadows |
| 4,537,457 A | 8/1985 | Davis, Jr. et al. |
| 4,578,675 A | 3/1986 | Macleod |
| 4,605,268 A | 8/1986 | Meador |
| 4,630,243 A * | 12/1986 | MacLeod ..................... 367/82 |
| 4,660,910 A | 4/1987 | Sharp et al. |
| 4,683,944 A | 8/1987 | Curlett |
| 4,698,631 A | 10/1987 | Kelly, Jr. et al. |
| 4,722,402 A | 2/1988 | Weldon |
| 4,785,247 A | 11/1988 | Meador et al. |
| 4,788,544 A | 11/1988 | Howard |
| 4,806,928 A | 2/1989 | Veneruso |
| 4,868,565 A * | 9/1989 | Mettes et al. ............ 340/854.9 |
| 4,884,071 A | 11/1989 | Howard |
| 4,901,069 A | 2/1990 | Veneruso |
| 4,914,433 A | 4/1990 | Galle |
| 4,924,949 A | 5/1990 | Curlett |
| 5,008,664 A | 4/1991 | More et al. |
| 5,052,941 A | 10/1991 | Hernandez-Marti et al. |
| 5,148,408 A | 9/1992 | Matthews |
| 5,192,948 A * | 3/1993 | Troyer et al. ............. 340/855.1 |
| 5,248,857 A | 9/1993 | Ollivier |
| 5,275,038 A * | 1/1994 | Sizer et al. .............. 73/152.02 |
| 5,278,550 A | 1/1994 | Rhein-Knudsen et al. |
| 5,302,138 A | 4/1994 | Shields |
| 5,311,661 A | 5/1994 | Zifferer |
| 5,332,049 A | 7/1994 | Tew |
| 5,334,801 A | 8/1994 | Mohn |
| 5,371,496 A | 12/1994 | Tanamachi |
| 5,444,184 A * | 8/1995 | Hassel .................... 174/113 R |
| 5,454,605 A | 10/1995 | Mott |
| 5,455,573 A | 10/1995 | Delatorre |
| 5,505,502 A | 4/1996 | Smith et al. |
| 5,517,843 A | 5/1996 | Winship |
| 5,521,592 A | 5/1996 | Veneruso |
| 5,568,448 A | 10/1996 | Tanigushi et al. |
| 5,650,983 A | 7/1997 | Kondo et al. |
| 5,691,712 A | 11/1997 | Meek et al. |
| 5,743,301 A | 4/1998 | Winship |
| RE35,790 E | 5/1998 | Pustanyk et al. |
| 5,810,401 A | 9/1998 | Mosing et al. |
| 5,833,490 A | 11/1998 | Bouldin |
| 5,853,199 A | 12/1998 | Wilson |
| 5,856,710 A | 1/1999 | Baughman et al. |
| 5,898,408 A | 4/1999 | Du |
| 5,908,212 A | 6/1999 | Smith et al. |
| 5,924,499 A | 7/1999 | Birchak et al. |
| 5,942,990 A | 8/1999 | Smith et al. |
| 5,955,966 A | 9/1999 | Jeffryes et al. |
| 5,959,547 A | 9/1999 | Tubel et al. |
| 5,971,072 A | 10/1999 | Huber et al. |
| 6,030,004 A | 2/2000 | Schnock et al. |
| 6,041,872 A | 3/2000 | Holcomb |
| 6,045,165 A | 4/2000 | Sugino et al. |
| 6,046,685 A | 4/2000 | Tubel |
| 6,057,784 A | 5/2000 | Schaaf et al. |
| 6,104,707 A | 8/2000 | Abraham |
| 6,108,268 A | 8/2000 | Moss |
| 6,123,561 A | 9/2000 | Turner et al. |
| 6,141,763 A | 10/2000 | Smith et al. |
| 6,173,334 B1 | 1/2001 | Matsuzaki et al. |
| 6,177,882 B1 | 1/2001 | Ringgenberg et al. |
| 6,188,223 B1 | 2/2001 | van Steenwyk et al. |
| 6,196,335 B1 | 3/2001 | Rodney |
| 6,209,632 B1 | 4/2001 | Holbert et al. |
| 6,223,826 B1 | 5/2001 | Chau et al. |
| 6,367,565 B1 | 4/2002 | Hall |
| 6,392,317 B1 | 5/2002 | Hall et al. |
| 6,405,795 B2 | 6/2002 | Holbert et al. |
| 6,641,434 B2 | 11/2003 | Boyle et al. |
| 6,655,464 B2 | 12/2003 | Chau et al. |
| 6,670,880 B1 | 12/2003 | Hall et al. |
| 6,866,306 B2 * | 3/2005 | Boyle et al. ................ 285/333 |
| 2002/0135179 A1 | 9/2002 | Boyle et al. |
| 2002/0193004 A1 | 12/2002 | Boyle et al. |
| 2003/0070842 A1 | 4/2003 | Bailey et al. |
| 2003/0213598 A1 | 11/2003 | Hughes |

* cited by examiner

METHOD AND APPARATUS FOR TRANSMITTING AND RECEIVING DATA TO AND FROM A DOWNHOLE TOOL

CROSS REFERENCE TO RELATED APPLICATIONS

The present patent application claims the benefit of the filing date of the U.S. patent application to David R. Hall, et al., filed Feb. 3, 2003, entitled "Data Transmission System for a Downhole Component," which claims priority to U.S. Provisional Patent Application Ser. No. 60/444,100 to David R. Hall, et al., filed Jan. 31, 2003, also entitled "Data Transmission System for a Downhole Component,"both of which are hereby incorporated in their entireties by reference.

FEDERAL RESEARCH STATEMENT

This invention was made with government support under Contract No. DE-FC26 01NT41229 awarded by the U.S. Department of Energy. The government has certain rights in the invention.

BACKGROUND OF INVENTION

The present invention relates to the field of data transmission systems for downhole environments, such as along a drill string used in oil and gas exploration or along casings or other equipment used in oil and gas production. More particularly, this invention relates to a removable transmission network for transmitting and receiving data between downhole tools without requiring separate manufacture or substantial modification of any tool.

For most of the last century, the drilling industry has desired a means to communicate with sensors and other equipment located at the drill bit and along the drill string to facilitate efficient deep well exploration and excavation. As exploration and drilling technology has improved, this goal has become more important in the industry for successful oil, gas and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data; as of yet, however, the goal has been. unrealized.

One of the obstacles to realizing the goal of real time communication along a drill string is the wide variety of tools required for drilling a modern day well that a downhole transmission network must accommodate. Although at first glance many downhole tools seem to resemble one another, the industry thus far has been unable to develop a transmission network capable of accommodating variations between tools without compromising their structural integrity or requiring their special manufacture. This problem is exacerbated by certain downhole tools that require unique internal components to achieve unique functions related to drill exploration and excavation. Jars, motors, hammers, steering subs, and blow-out preventers, for example, each require special function internal components to achieve their specific purposes. A downhole transmission network capable of universal application to existing downhole tools must thus be able to accommodate both external and internal variances between tools without disrupting their unique functions or compromising their structural integrity.

The present invention recognizes that despite the variances between individual downhole tools designed to perform individual functions, all tools require a central passageway to permit the flow of drilling fluid from the surface to the drill bit and back again. The present invention seeks to exploit this passageway as a means by which to produce a downhole transmission network capable of universal application to preexisting downhole tools that are not configured to convey signals along their lengths (as described above) and neither disrupts the tools' unique functions nor compromises their structural integrity.

SUMMARY OF INVENTION

The present invention is a transmission line network system for transmitting and receiving data through a series of downhole tools. Certain embodiments of this invention provide a transceiving element attached to an end of a downhole tool. A conduit containing a coaxial cable capable of communicating an electrical signal is attached to the transceiving element and extends through a central bore of the downhole tool and through the central bore of any tool intermediate the first transceiving element and a second transceiving element. Upon receiving an electrical signal from the cable, the second transceiving element may convert such signal to a magnetic field. The magnetic field may be detected by a third transceiving element in close proximity to the second transceiving element. In this manner, many different tools that are not configured to convey signals along their lengths may be included in a downhole transmission network without requiring substantial modification, if any, of any particular tool.

Disclosed is a downhole transmission line network that may be easily implemented and used in connection with new or preexisting downhole tools that are not configured to convey signals along their lengths without requiring substantial modification of such tools and without compromising their structural integrity.

Also disclosed is a downhole transmission line network that effectively resists the extreme temperatures, pressure, torque, and corrosive environment characteristic of a downhole well.

Also disclosed is a downhole transmission line network system that accurately and reliably transmits and receives signals between discrete downhole tools while permitting slight physical gaps between such downhole tools.

Furthermore, a downhole transmission line network system is disclosed that transmits and receives signals between discrete downhole tools with a high degree of accuracy so as to minimize the need for repeaters.

These and other features and advantages of the present invention will be set forth or will become more fully apparent in the description that follows. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings.

DETAILED DESCRIPTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

As used in this specification, the term "downhole" is intended to have a relatively broad meaning, including such environments as drilling for oil and/or gas, and extraction of other subterranean minerals, as well as for drilling for water and other subsurface liquids, and for geothermal exploration. Also included are systems of casings and other equipment used in the production of these sub-surface resources. The term "downhole tool" or "tool" refers to any pipe or tool having a central bore and used in exploration and/or excavation of a downhole well. Examples of such tools include, without limitation, casings, drill pipe, drill collars, drill bit subs, transmission links, reamers, stabilizers, motors, turbines, mud hammers, Jars, Kellys, blow-out preventers, steering subs and drill bits. The term "transmission" as used in connection with the phrase "data transmission" and the like, is intended to have a relatively broad meaning, referring to the passage of signals in at least one direction from one point to another. The term "magnetically conductive" refers to a material having a magnetic permeability greater than that of air. Finally, the term "electrically insulating" means having a high electrical resistivity, preferably greater than that of steel.

Figure 1:
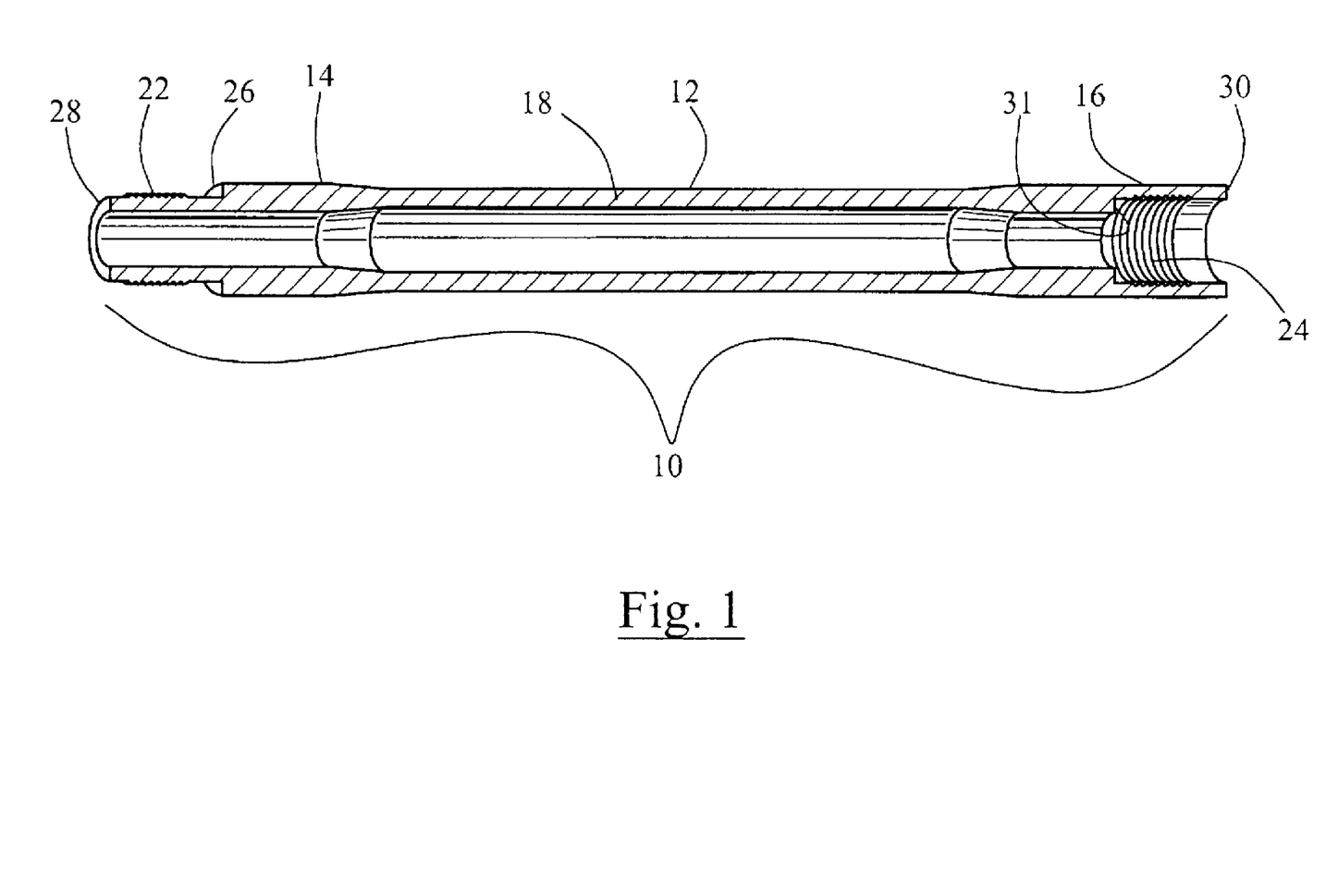
FIG. 1 is a cross section of a section of drill pipe having physical attributes characteristic of downhole tools generally.
Figure 8:
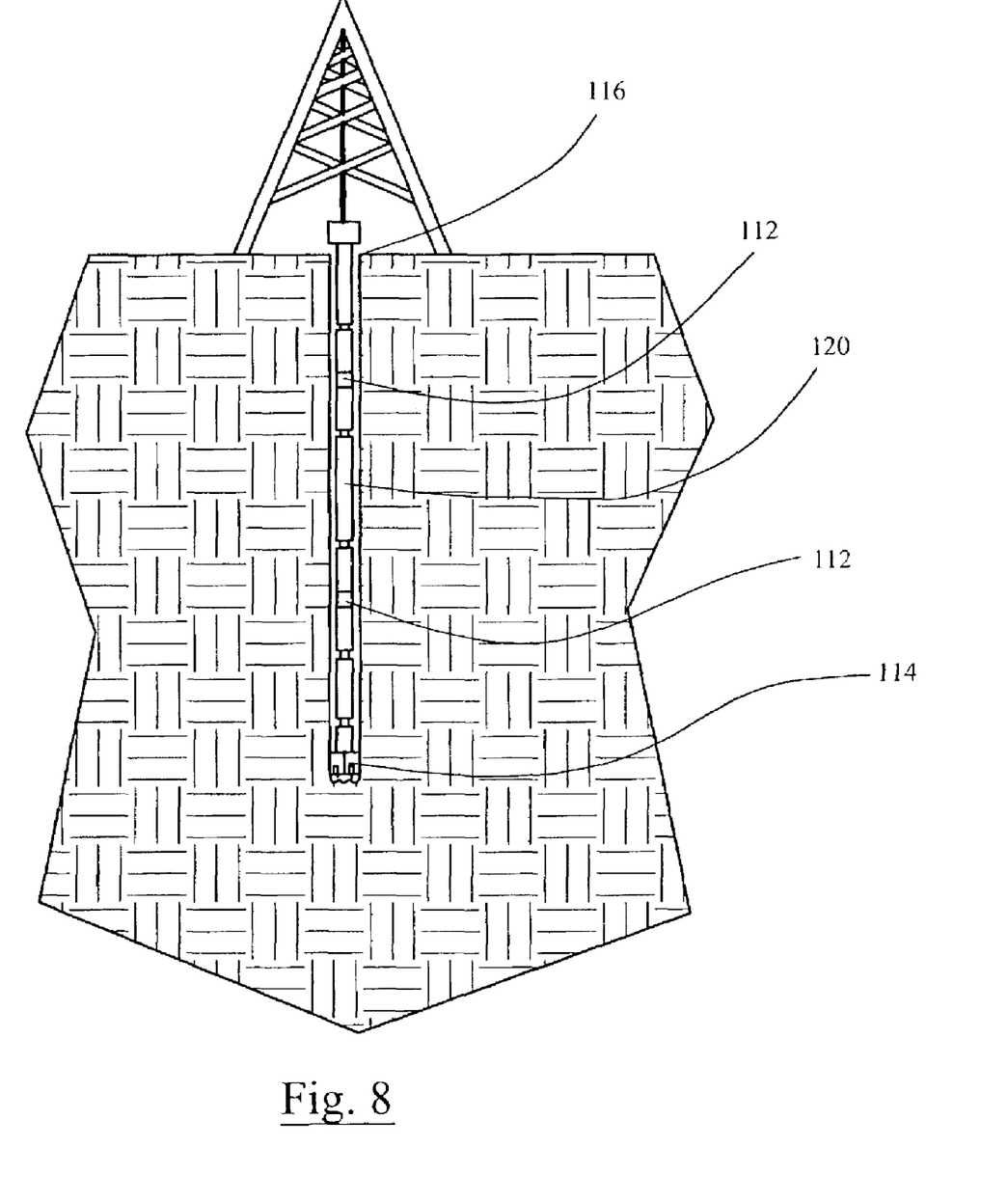
FIG. 8 is a cross-sectional view of the transmission network and system of the present invention as implemented in a series of downhole tools comprising a drill string.

Referring to FIGS. 1 and 8, a downhole tool 10 may comprise a substantially cylindrical body 12 intermediate a first end 14 and a second end 16. Although the downhole tool 10 of FIG. 1 is a section of drill pipe, its purpose is to generally represent the essential characteristics of all downhole tools 10. Indeed, certain shared functional characteristics are required in order to enable downhole tools 10 to join together in series to form a drill string 120, to fit uniformly within a borehole formed by a drill bit 114, and to accomplish the purpose of the drill string 120 in exploring and further excavating the borehole. Heavy weight drill pipe and drill collar, for example, differ from the drill pipe of FIG. 1 only in the thickness of the outer wall 18. Similarly, a reamer, used to maintain the gage of the borehole as the bit 114 wears, and a stabilizer, used to ride against the bore wall to give stability to the drill string 120, consist essentially of the drill pipe of FIG. 1 with bearing and cutting surfaces incorporated into the outer wall surface 18 of the body 12.

Some downhole tools, like jars, motors, hammers, steering subs, and blow-out preventers, incorporate internal components into the basic downhole tool structure of FIG. 1 to achieve unique functions related to borehole exploration and/or excavation. Although such tools have traditionally complicated efforts in achieving a downhole transmission network capable of universal application to downhole tools generally, specific function tools, like other downhole tools, have a central passageway to permit the flow of drilling fluid from the surface 116 to the drill bit 114. The present invention seeks to exploit this central passageway as the means by which any downhole tool may communicate via the transmission network system herein disclosed without requiring substantial modification, if any, of any particular tool. The present invention also exploits this central passageway as a means by which a signal may be transceived between a first and second downhole tool, where one or more intermediate downhole tools separate the first downhole tool from the second.

By way of example and not limitation, a first end 14 of a downhole tool 10 may comprise a pin end joint having external tapered threads 22. Likewise, a second end 16 of a downhole tool 10 may comprise a box end joint having internal tapered threads 24. An elongate cylindrical body 12 may lie intermediate the first end 14 and the second end 16. The cylindrical body 12 may extend between thirty and ninety feet in length. A first end 14 and a second end 16 may be complementary, such that a first end 14 of a first downhole tool 10 may be joined to a second end 16 of a second downhole tool. In this manner, as many as 700 downhole tools 10 may be joined together to form a drill string 120 as long as 20,000 feet.

Figure 4:
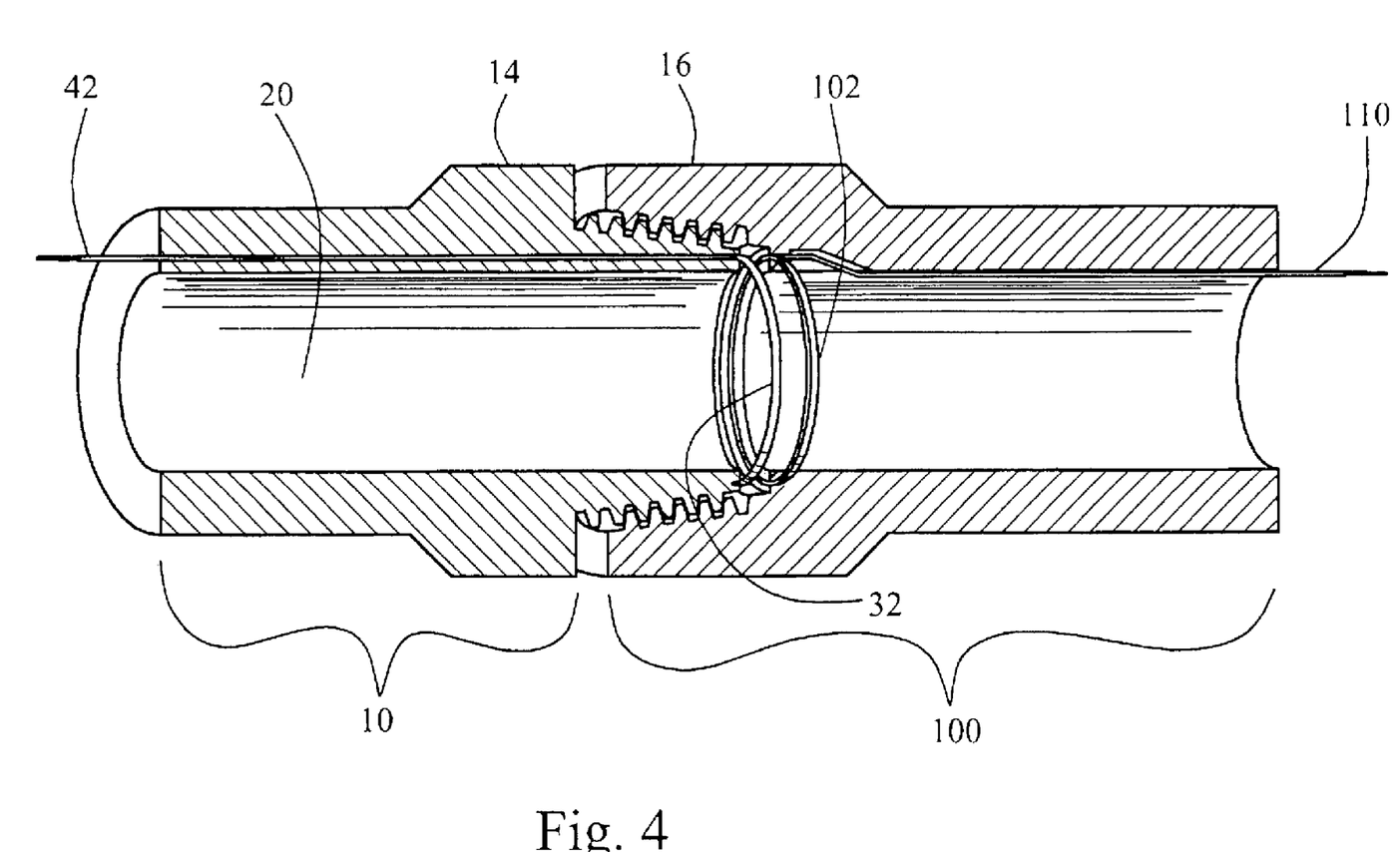
FIG. 4 is a cross-sectional view of the first end of a first downhole tool joined to a second end of a second downhole tool as herein disclosed.

There are several designs currently available for a first end 14 and a second end 16 of a downhole tool 10, and, more particularly, for a pin end joint on the first end 14 and a box end joint on the second end 16. At present, the most preferred design for use with the present invention is that described in U.S. Pat. No. 5,908,212 to Grant Prideco, Inc. ("Prideco"), the entire disclosure of which is incorporated herein by reference. According to this design, a pin end joint on the first end 14 includes an external torque producing surface 26 and an internal torque producing surface 28, with external tapered threads 22 extending intermediate the external torque producing surface 26 and the internal torque producing surface 28. Likewise, a box end joint on the second end 16 includes an external torque producing plane 30, intermediate internal tapered threads 24, and an internal torque producing plane 31. When two downhole tools 10 are connected, as shown in FIG. 4, a pin end on the first end 14 may be threaded into a box end on the second end 16 with sufficient force so that the external torque producing surface 26 of the pin end 14 engages the external torque producing plane 30 of the box end 16. As a result, the internal torque producing surface 28 of the pin end 14 is necessarily brought into close proximity or contact with the internal torque producing plane 31 of the box end 16. The advantages this relationship has to the present invention will be discussed in more detail below.

Figure 2:
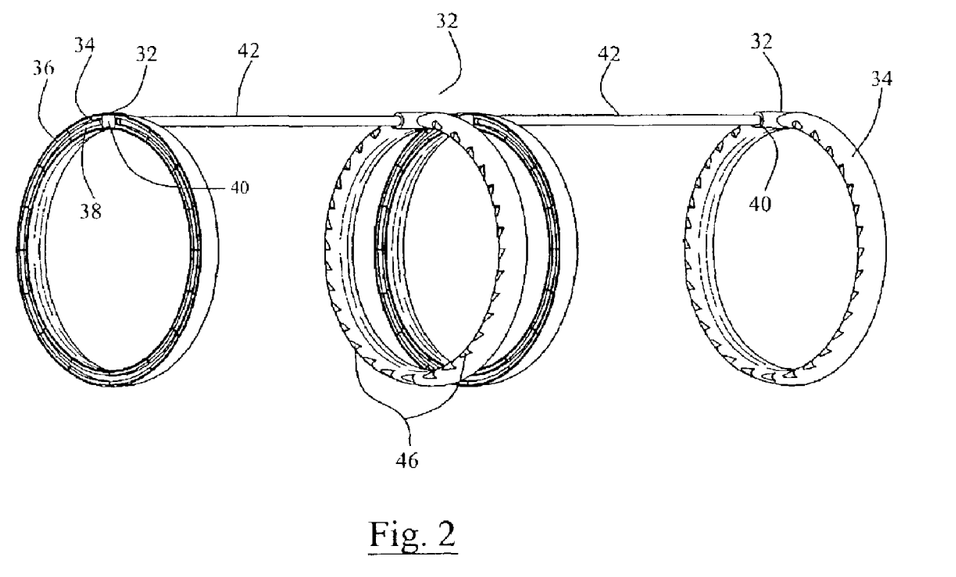
FIG. 2 is an isolated perspective view of the transmission network of the present invention.
Figure 2A:
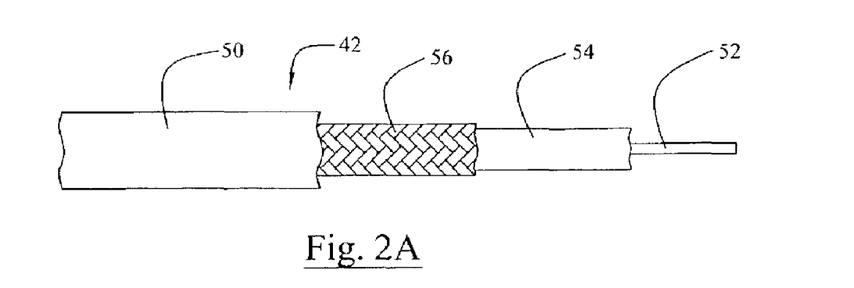
FIG. 2A is an enlarged view of the construction of one embodiment of the cable of the present invention.

Referring now to FIGS. 2 and 2A, the transmission network of the present invention may comprise a cable 42 connected to a transmission element 32, wherein the transmission element 32 may transmit, receive and/or transceive a signal. A cable 42 may comprise a housing 50, a conductive core 52 running through the center of the housing, and a dielectric sheath 54 surrounding the core 52. The housing 50 preferably comprises metal capable of resisting deformation in its normal state of use, like steel. Stainless steel, such as 316 or 316 L stainless steel manufactured by Plymouth Tube, Salisbury, Md., is currently most preferred. In one embodiment of the present invention, a conductive sheath 56 is in electrical contact with the housing 50. In this embodiment, a conductive sheath 56 surrounds a dielectric sheath 54, which surrounds a conductive core 52. Alternatively, a dielectric sheath 54 may be in contact with a housing 50 and surround a conductive core 52. A dielectric sheath 54 prevents electrical contact between a conductive core 52 and a housing 50. In one embodiment of the present invention, an inner layer of the dielectric sheath 54 is removed from around a conductive core 52 at each end, while leaving an outer layer of the dielectric sheath 54 in place next to the housing 50. In this manner, a connector 40 may be inserted around the conductive core 52 and within the dielectric sheath 54.

At present, a cable 42 preferably has a characteristic impedance in the range of about 30 to about 120 ohms, most preferably with a characteristic impedance in the range of 50 to 75 ohms. Because the attenuation of cable 42 decreases with increasing diameter, the largest diameter compatible with installation in pipe chosen for a particular application should be used. Most preferably the cable 42 has a diameter of about 0.25 inches or larger. The dielectric sheath 54 may provide close to 100% coverage, and may comprise fully dense polymer having low dielectric loss, preferably from the family of polytetraflouroethylene (PTFE) resins, such as Dupont Teflon. A foamed polymer may also be used as core insulation. It is preferable to select the electrical properties of the conductor so as to match the impedance of the transmission element 32 to which it is attached.

A transmission element 32 may comprise a housing 34, a magnetically conductive element 36, a communication element 38 and a connector 40. In a preferred embodiment, a housing 34 surrounds a magnetically conductive element 36, which in turn surrounds a communication element 38 attached to a connector 40.

A housing 34 may comprise a steel ring having a generally u-shaped trough. A housing 34 having a shape of, for example, an oval, square, rectangle, triangle or any other shape also falls within the scope of the present invention. In a preferred embodiment, a steel ring housing 34 has ridges 46 around its circumference to facilitate retention of the steel ring 34 by a downhole tool 10. According to one aspect of the present invention, a housing 34 may include a shape and size sufficient to allow the first and second ends 14 and 16 of a downhole tool 10 to be machined in the field after extended use without compromising the integrity and functionality of a transmission element 32 implemented therein.

Indeed, in one embodiment of the present invention, a housing 34 is dimensioned such that a communication element 38 may lie in the bottom of the housing 34 and still be separated a distance from the top surface of the housing 34. In this embodiment, the distance between the communication element 38 and the top surface of the housing 34 may comprise at least about 0.01 inches, more preferably at least about 0.06 inches.

A magnetically conductive element 36 disposed within a housing 34 preferably has a magnetic permeability greater than air. Materials having too high a magnetic permeability tend to have hysteresis losses associated with reversal of the magnetic domains themselves. Accordingly, a material is desired having a permeability sufficiently high to keep the field out of the housing 34 and yet sufficiently low to minimize losses due to magnetic hysteresis. Preferably, the magnetic permeability of the element 36 should be greater than that of steel, which is typically about 40 times that of air, more preferably greater than about 100 times that of air. Preferably, the magnetic permeability is less than about 2,000. More preferably, the element 36 has a magnetic permeability less than about 800. Most preferably, the element 36 has a magnetic permeability of about 125.

In order to avoid or reduce eddy currents, the element 36 may be electrically insulating as well as magnetically conductive. Preferably, the element 36 has an electrical resistivity greater than that of steel, which is typically about 12 micro-ohm cm. Most preferably, the element 36 has an electrical resistivity greater than about one million ohm-cm.

The magnetically conductive element 36 may comprise a single magnetically conductive, electrically insulating material. A presently preferred material is ferrite, particularly ferrite grade 61 having a magnetic permeability of about 125, such as that currently available from Fair-Rite Products Corp., Wallkill, N.Y. and Gascyl Enterprises, Coquitlan, B.C., Canada. Ferrite is described in the on-line edition of the Encyclopedia Britannica as "a ceramic-like material with magnetic properties that are useful in many types of electronic devices. Ferrites are hard, brittle, iron-containing, and generally gray or black and are polycrystalline—i.e., made up of a large number of small crystals. They are composed of iron oxide and one or more other metals in chemical combination." Ferrite is "formed by the reaction of ferric oxide (iron oxide or rust) with any of a number of other metals, including magnesium, aluminum, barium, manganese, copper, nickel, cobalt, or even iron itself . . . [The] most important properties of ferrites include high magnetic permeability and high electrical resistance." Alternatively, the element 36 may comprise a combination of materials selected and configured to give magnetically conductive and electrically insulative properties to the element 36 as a whole. For example, the element 36 may comprise a matrix of particles of a material that is magnetically conductive and particles of another material that is electrically insulating, wherein the matrix is designed so as to prevent the conduction of electrical currents while promoting the conduction of a magnetic current. One such material, composed of ferromagnetic metal particles molded in a polymer matrix, is known in the art as "powdered iron." Alternatively, the element 36 may be formed from laminations of a material such as silicon transformer steel separated by an electrically insulating material, such as a ceramic, mineral (mica), or a polymer. Because the induced electric field is always perpendicular to the magnetic field, the chief requirement for the element 36 is that the magnetic field be accommodated in a direction that wraps around the communication element 38, whereas electrical conduction should be blocked in the circumferential direction, perpendicular to the magnetic field and parallel to the communication element 38.

A communication element 38 may be circumscribed by a magnetically conductive element 36. A communication element 38 may comprise an electrically conductive coil which may form a single or multi-loop inductive coil comprising, for example, copper or silver plated, copper-clad steel wire. Alternatively, a communication element 38 may comprise acoustic transceivers, optic fiber couplers or electrical contacts. The communication element 38 may further provide an insulative coating such as varnish, enamel, or a polymer. Preferably, the insulative coating is a tough, flexible polymer such as high density polyethylene or polymerized tetrafluoroethane (PTFE).

In one embodiment, the communication element 38 may be embedded within a material conforming to any space existing between the communications element 38 and the magnetically conductive element 36. Such a material should be electrically insulating and should provide sufficient resiliency to reinforce the magnetically conductive element 36. The presently preferred material for this purpose is a two-part epoxy formulation, including a powdered material such as fumed silica or fine aluminum oxide to provide abrasion resistance. Other materials, such as room-temperature curable urethanes, may be used so long as they are able to withstand extreme conditions such as those found in a downhole environment.

It is currently believed that relatively broad bandwidth may be accomplished by providing a low number of turns or loops in the communication element 38 and low reluctance in the magnetic path, which in turn produces surprisingly low mutual inductance in a relatively large diameter communication element 38. For a two-turn communication element 38 with a 4.75-inch diameter, the mutual inductance of the assembled toroid is about 1 micro Henry. With a 50 ohm resistive load, peak signal transmission is at about 4 MHz, and at power transmission extends from about 1 MHz to about 12 MHz. The inductive reactance is about 65 ohms, and the attenuation is only about 0.35 dB per length of downhole tool 10, equivalent to power transmission of about 92 percent. In some respects, the communication element 38 is thought to perform as a transmission-line transformer, wherein coupling between adjacent coils that comprise the communication element 38 results in distributed elements of both capacitance and inductance. Thus, the term "inductive coil" is intended to include both coils that transfer signals via induction as well as coils that act as a transmission-line transformer. As adjacent communication elements 38 are assembled, a serial filter is created, which effectively reduces bandwidth. Theoretically, if each individual communication element 38 had a narrow bandwidth, the bandpass of the filter would change as additional elements 38 were added, which would require that each individual element 38 be separately tuned according to its position in the system. A surprising feature of the present invention, however, is that any number of identical elements 38 can be along any number of downhole tools 10 while still enabling efficient signal coupling. For example, in a test of 30 connected downhole tools 10, the total attenuation was only 37.5 dB (0.018% power transmission), 70% of which was in the cable 42 itself, which had a dielectric sheath 54 diameter of 0.047 inches. Maximum power transmission was at 4.2 MHz and the bandwidth, at half power, was 2 MHz. Thus a six volt, 90 milliwatt signal resulted in a detected signal, after 30 downhole tools of 80 mV.

Figure 2B:
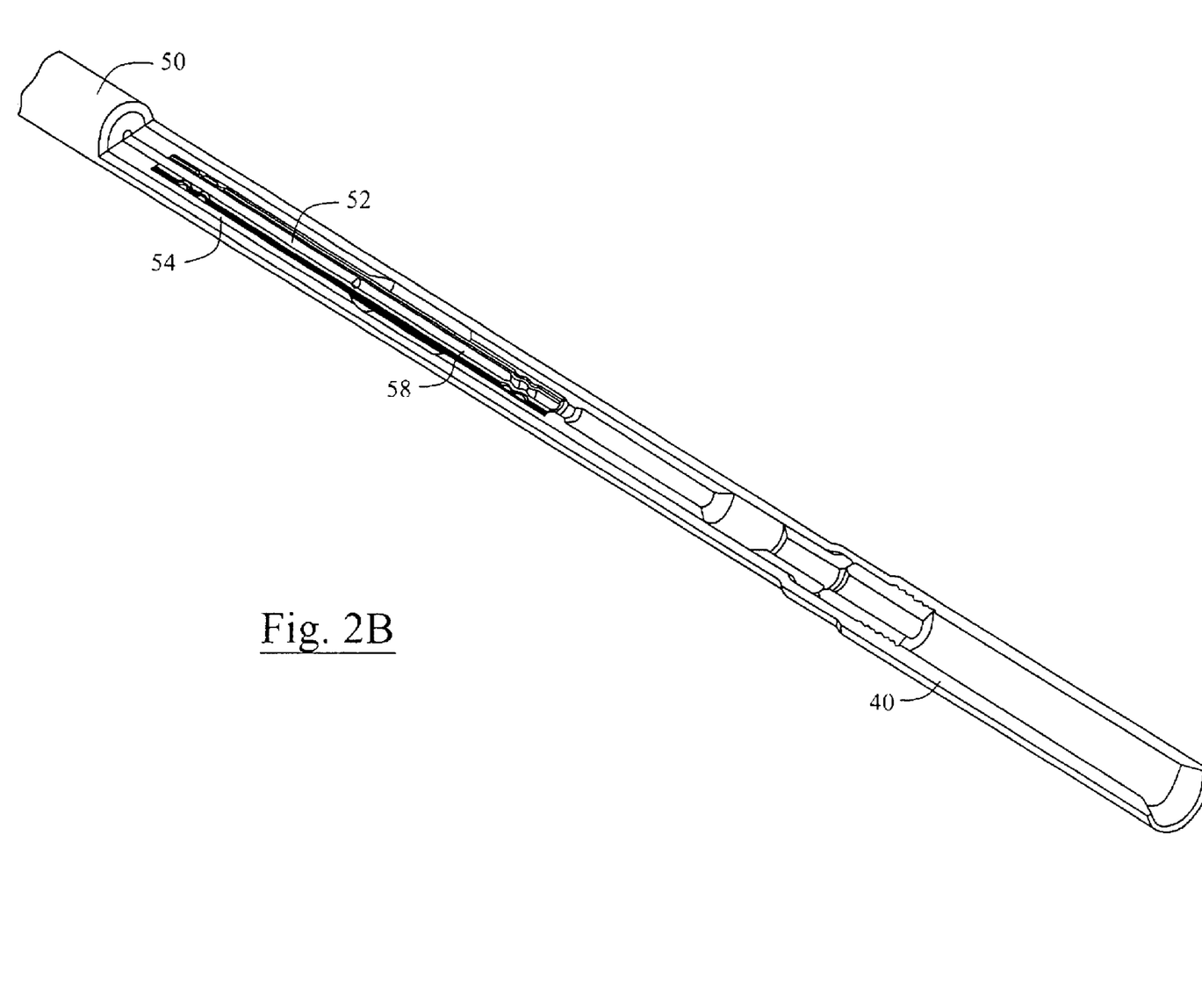
FIG. 2B is an enlarged view of the construction of one embodiment of the connector of the present invention.

As shown in FIG. 2B, a connector 40 permits the cable 42 to transmit an electrical signal to a communication element 38. A connector 40 may incorporate a conductive sleeve 58 that fits around the conductive core 52. A connector 40 may also incorporate an insulative coating, such as TEFLON, to prevent electrical contact between the conductive sleeve 58 and the cable housing 50. A connector 40 may make contact with a portion of a conductive core 52, and may be welded to a portion of a transmission element housing 34.

A transmission element 32 may further comprise a polymer seal (not shown), such as epoxy. The polymer seal promotes retention of the magnetically conductive element 36 and the communication element 38 within the housing 34, while preventing contamination of such components from the downhole environment.

Figure 3:
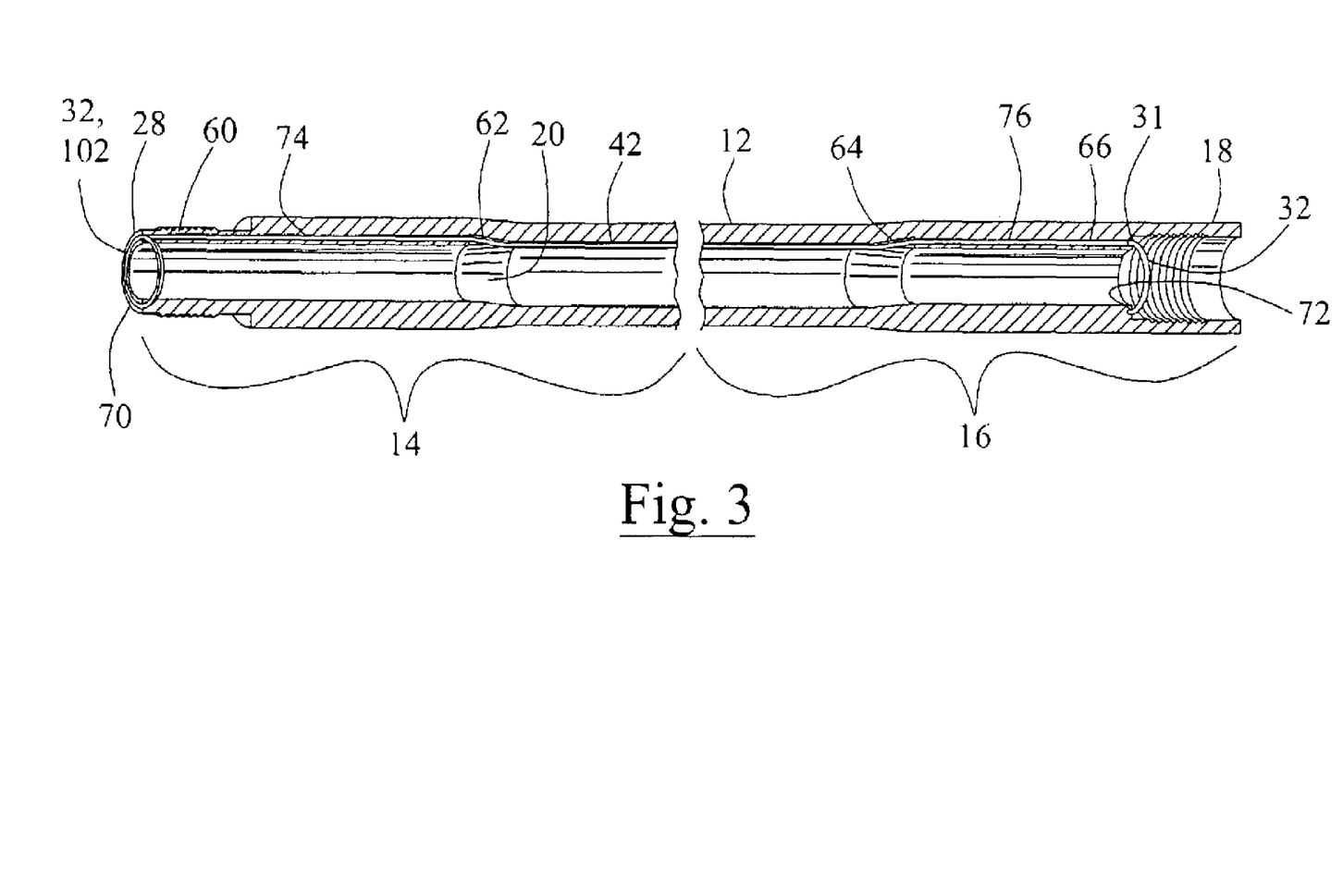
FIG. 3 is a cross-sectional view of the first and second ends of a downhole tool adapted to receive the transmission network of the present invention.

Referring to FIGS. 3 and 4, a transmission element 32 may be positioned proximate a first end 14 and/or a second end 16 of a downhole tool 10. In this manner, when the first end 14 of a first downhole tool 10 is joined with the second end 16 of a second downhole tool 100, the first transmission element 32 of the first downhole tool 10 is brought into close proximity with the second transmission element 102 of the second downhole tool 100. The first communication element 38 of the first transmission element 32 may directly contact a second magnetically conductive element (not shown) of the second transmission element 102, although a slight gap between the two is permissible. Preferably, the first and second transmission elements 32 and 102 are within about 0.5 mm of each other, more preferably within about 0.25 mm of each other, and most preferably the first and second transmission elements 32 and 102 are in contact with each other.

When a communication element 38 is energized by an electronic signal, an electromagnetic field is created and shared by the opposing transmission element 32. The field is sufficient to permit the transmission of the signal across any gap existing between the first transmission element 32 of the first downhole tool 10 and the second transmission element 102 of the second downhole tool 100, along the second cable 110 connected to the second transmission element 102, and to a third transmission element (not shown) at the opposite end of the second downhole tool 100, where the process may be repeated.

Repeaters 112 may also be positioned at predetermined locations along the network in order to boost and correct the signal and send it forward. In this manner, electrical power and data may be transmitted along the network between transmission elements 32 and 102 and a drill bit 114.

A first end 14 of a downhole tool 10 may further include a first annular recess 70 in a second torque producing surface 28 configured to receive and retain a first transmission element 32. Similarly, a second end 16 of a downhole tool 10 may include a second annular recess 72 in a second torque producing plane 31 to receive and retain a second transmission element 102. Preferably, each recess 70 and 72 is located so as to lie equidistant between an inner and outer diameter of the surface 28 or plane 31 in which it is contained. Alternatively, an annular recess 70 and 72 may be formed at either an inner or outer diameter of a first end 14 or second end 16, thereby creating an annular recess 70 and 72 that is open on more than one plane.

An annular recess 70 and 72 may be machined into a first and second end 14 and 16 by conventional tools either before or after the end 14 and 16 is attached to the body 12. The dimensions of an annular recess 70 and 72 may be varied as necessary to avoid interfering with the mechanical strength of the end 14 and 16 to ensure substantial alignment between a first annular recess 70 on a first downhole tool 10 and a second annular recess 72 on a second downhole tool 100 where the first and the second downhole tools 10 and 100 are joined to form part of a drill string 120.

An annular recess 70 and 72 is preferably configured to open axially in a direction parallel to the length of a drill string 120. In alternative embodiments, however, an annular recess 70 and 72 may be configured to open radially in a direction perpendicular to the length of a drill string 120. Such an offset configuration does not materially affect the performance of the communication elements 38 of the present invention. A transmission element 32 may be retained in an annular recess 70 and 72 by means of a polymeric bonding material such as epoxy, polyurethane, polytetrafluoroethylene of perfluoroalkoxy. Preferably, however, a transmission element 32 is retained in an annular recess 70 and 72 by a press fit.

First and second openings 60 and 62 may be provided proximate a first annular recess 70 for forming a channel to receive a cable 42 attached to a transmission element 32. A first opening 60 is provided in an outer surface of a downhole tool's body wall 18, preferably at a point in the bottom of a first annular recess 70, by gun drilling or by any means known to those skilled in the art. The first opening 60 commences in a first annular recess 70 and continues in a direction away from the recess 70 towards a central bore 20 of the tool 10. The drilling is terminated before intersecting the inside wall of the central bore 20. A second opening 62 is then formed by machining, typically other than by drilling, preferably by milling back a portion of the inside wall of the central bore 20 to intersect a distal end of the first opening 60. The first and second openings provide a smooth transition between the central bore 20 and the openings 60 and 62, and promote a reduction of stress in the sidewall that might otherwise be present due to the formation of the openings. The openings thus formed provide a channel 74 between the first annular recess 70 and the central bore 20. First and second holes 64 and 66 may be provided proximate a second annular recess 72 at a second end of a downhole tool 10 for the same purpose and in the same manner. A cable 42 may be held in tension between the first and second receiving channels 74 and 76 formed thereby.

Figure 5:
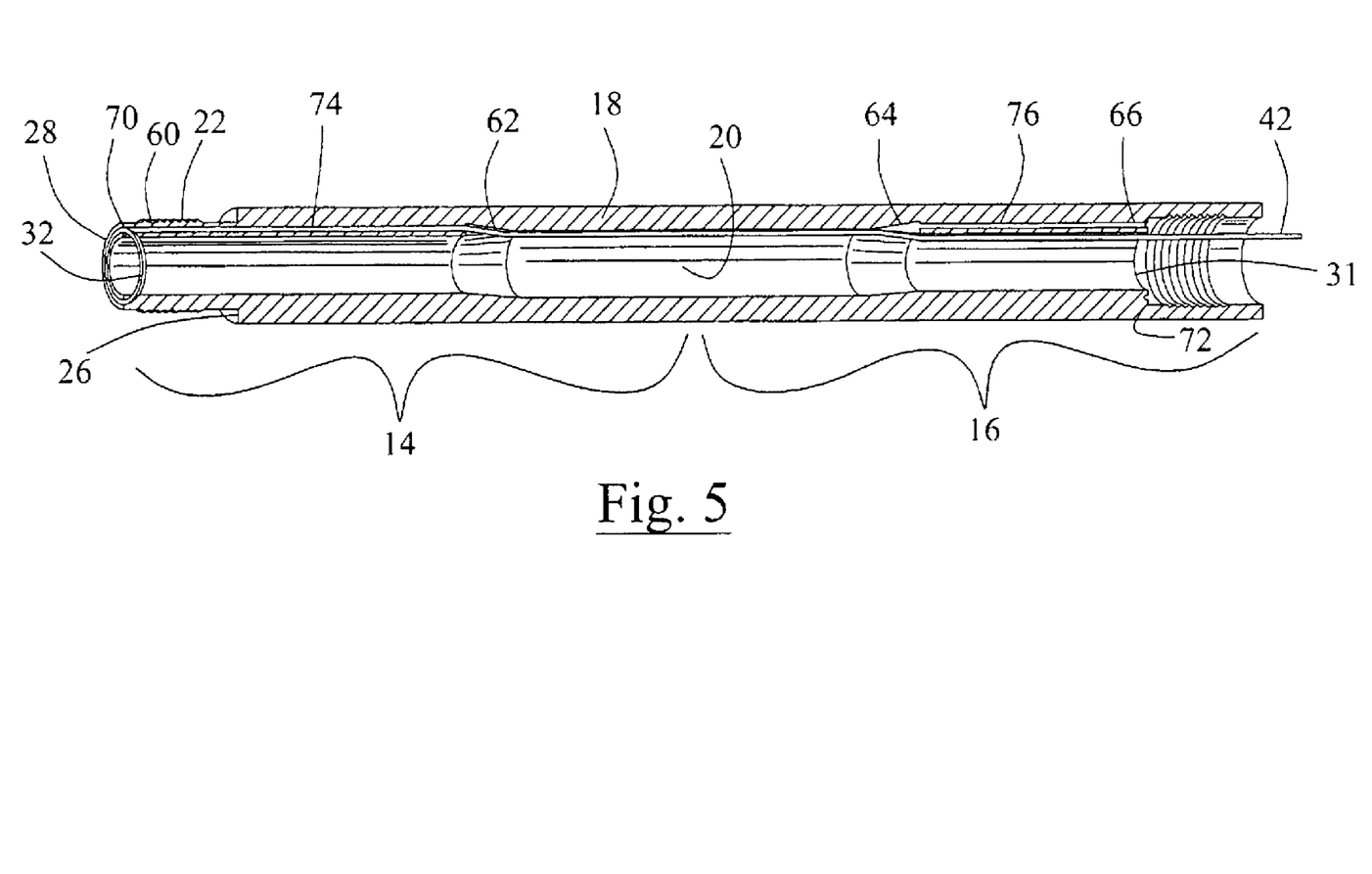
FIG. 5 is a cross-sectional view of an embodiment of the transmission network and system of the present invention integrated in a downhole tool having first and second end joints joined directly together with no intermediate cylindrical body.

Referring now to FIG. 5, an embodiment of the transmission network of the present invention may comprise a first end 14 directly connected to a second end 16. First and second annular recesses 70 and 72 are provided in a first torque producing surface 28 of the first end 14 and a second torque producing plane 31 of the second end 16, respectively, for positioning a transmission element 32. A cable 42 attached to a first transmission element 32 extends through a first receiving channel 74 formed by a first and second opening 60 and 62, along the inside wall of the central bore 20, and may extend through a second receiving channel 76 formed by a first and second hole 64 and 66, and connects to a transmission ring 32 at the opposite end of the tool 10. Although FIG. 5 depicts both a first and second annular recess 70 and 72 and a first and second receiving channel 74 and 76 for retaining a first and second transmission element 32 and 102, the transmission network of the present invention may also implement a transmission element 32 and attached cable 42 retained at only one end of a downhole tool 10, as illustrated.

Figure 6:
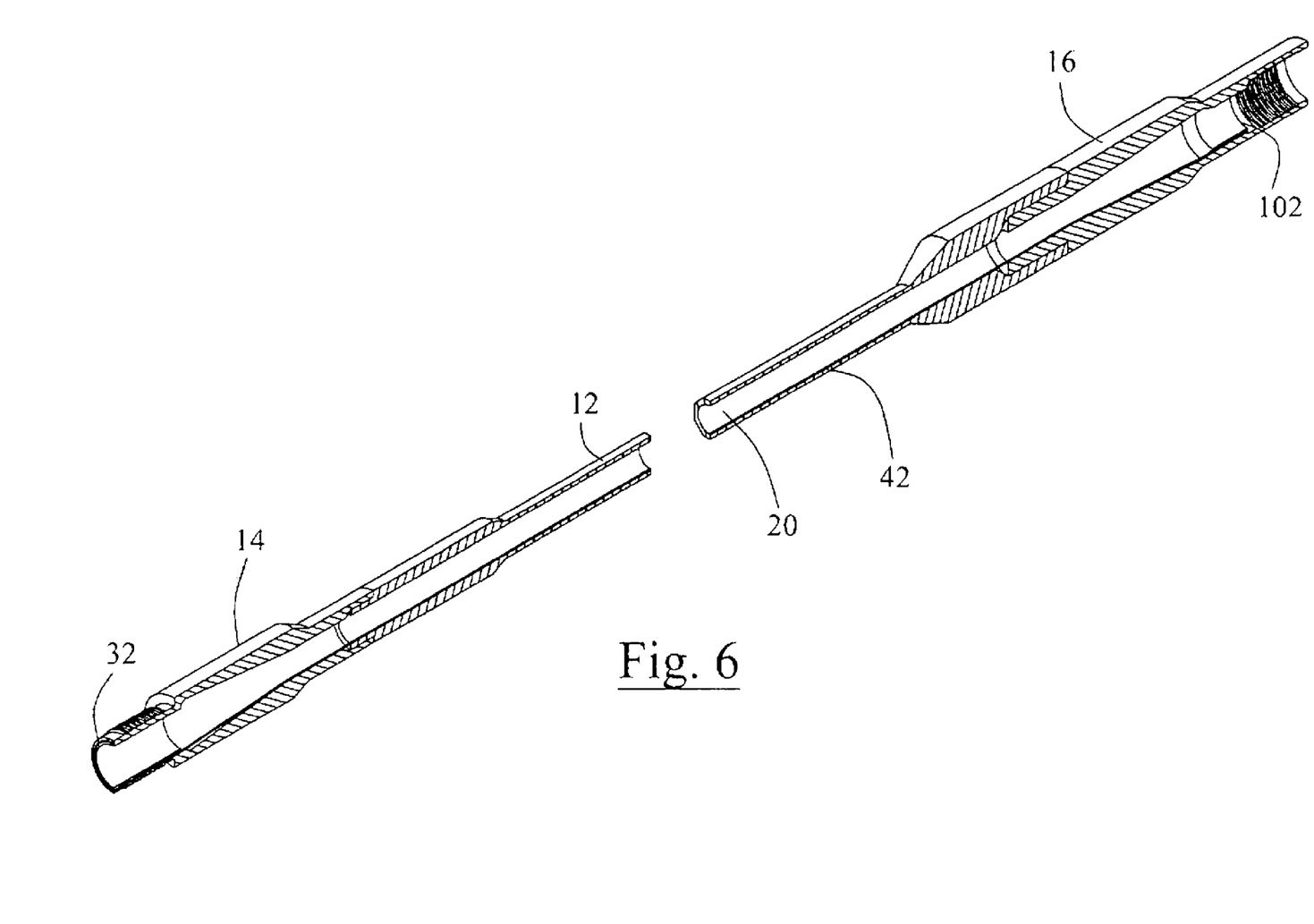
FIG. 6 is a cross-sectional view of a second embodiment of the transmission network and system of the present invention as implemented in a Kelly-type downhole tool.

FIG. 6 depicts (in broken section) an embodiment of the present invention configured for use in a Kelly downhole tool which is originally not configured to convey signals along its length, which tool is used to transfer torque from a surface platform 116 to a drill string 120. A first transmission element 32 connected to a cable 42 is provided at a first end 14 of the tool, and a second transmission element 102 connected to the same cable 42 is provided at the second end 16 of the tool. The cable 42 runs through the center bore 20 and joins the transmission elements 32 and 102 as depicted in FIG. 5.

Figure 7:
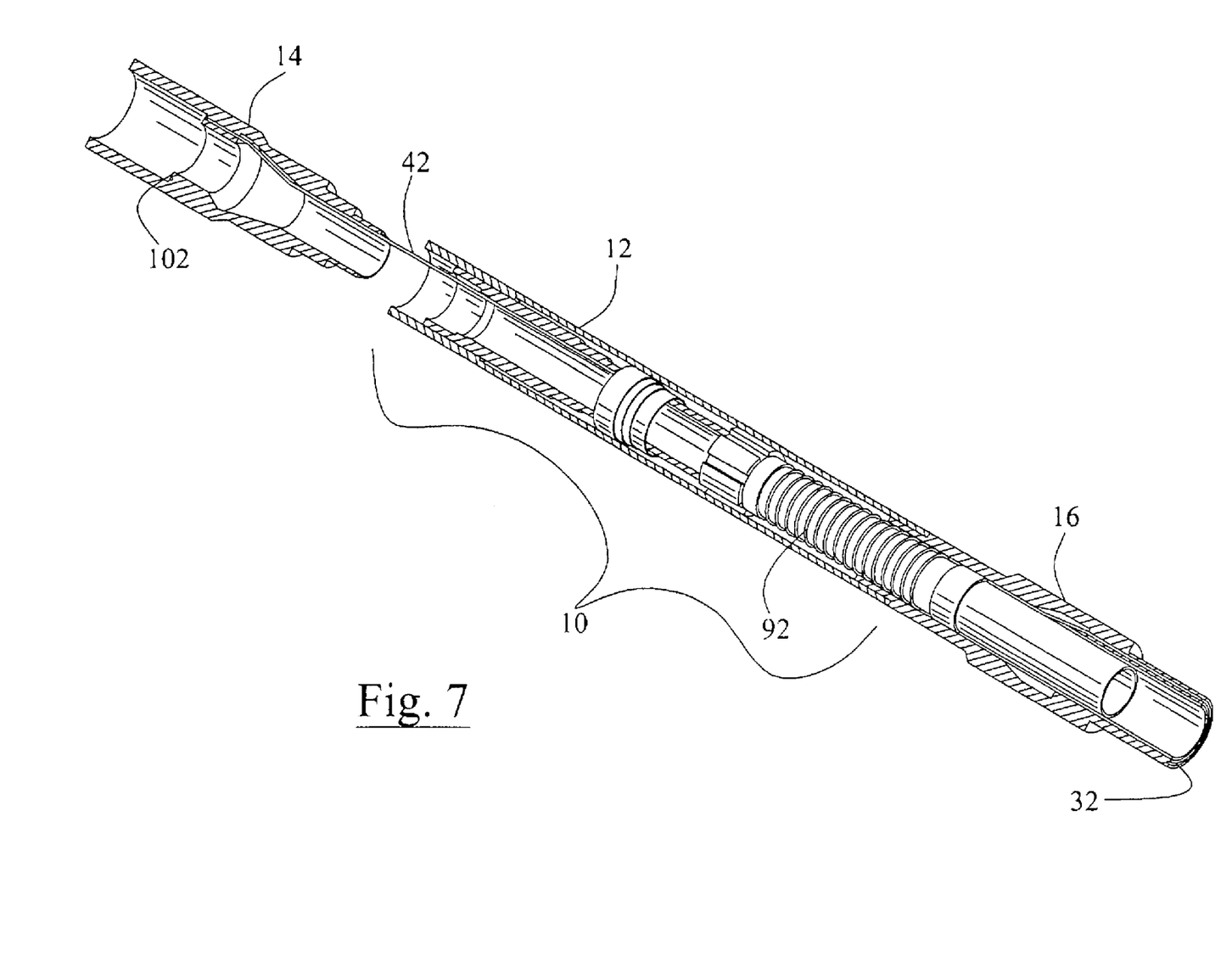
FIG. 7 is a cross-sectional view of a third embodiment of the transmission network and system of the present invention as implemented in a Jar-type downhole tool.

Referring to FIG. 7, one embodiment of the present invention contemplates integrating a downhole transmission network in a downhole tool 10 having internal components, such as a Jar, which is not configured to convey signals along its length, used to provide a percussive force to a drill string 120 to free it when it gets stuck in the borehole, i.e. to jar the drill string 120 loose from a stuck position. The tool depicted herein 10 features an elongate cylindrical body 12 intermediate a first end 14 and a second end 16. Transmission elements 32 and 102 are provided in the second torque producing surface 28 and the second torque producing plane 31 respectively (as illustrated in FIG. 3), and a cable 42 joins each transmission ring 32 and 102. In this embodiment, the cable 42 may include loops 92 adjacent an inner surface of the central bore 20. Such loops 92 are provided to accommodate the special functional characteristics of the Jar. Indeed, in order to emit a jarring force, a Jar implements an internal sliding hammer component. This unique feature of the Jar tool requires a cable 42 to linearly extend when the Jar fires. The loops 92 of the present invention effectively allow the cable 42 to extend as necessary when the internal components of the Jar are cycled.

We claim:

1. A system for transceiving data between downhole tools located on a drill string, said system comprising:
   a drill string comprising a proximal end, a distal end, and a length;
   a first cable substantially retained by a central bore of said drill string to transmit a signal carrying first information between said proximal end and said distal end over a first portion of said length, said first portion of said length comprising a plurality of downhole tools, wherein said plurality of downhole tools are not configured to convey said signal along their lengths;
   a first transmission element coupled to said first cable to convert said signal to a magnetic field;
   a second transmission element proximate said first transmission element to receive said magnetic field and convert said magnetic field into a second signal carrying said first information;
   a second cable coupled to said second transmission element and substantially retained by a central bore of said drill string to transmit said second signal between said proximal end and said distal end over a second portion of said length, said second portion of said length comprising a plurality of downhole tools, wherein said plurality of downhole tools are not configured to convey said signal along their lengths;
   each of said first and said second transmission elements comprises:
   a housing comprising a ring having a substantially U-shaped trough;
   said ring further comprising circumferential ridges integrated into an outer surface of said ring to enhance connection of said ring into one of the downhole tools;
   a magnetically conductive trough disposed within said housing;
   an electrically conductive coil disposed within said trough; and
   a connector coupled to said cable and to at least one of said conductive element and said housing.

2. The system of claim 1, wherein each of said downhole tools comprises a first end and a second end, wherein said first end of a first downhole tool is connected to said second end of a second downhole tool at a torque producing interface.

3. The system of claim 2, wherein said first transmission element is coupled to said first end of said first downhole tool at said torque producing interface, and wherein said second transmission element is coupled to said second end of said second downhole tool at said torque producing interface.

4. The system of claim 1, wherein said drill string further comprises a plurality of downhole tools connected at a plurality of torque producing interfaces, each said downhole tool comprising:
  a cylindrical body having an outer wall and a central bore;
  a first end attached to said body, said first end having a first torque producing surface, a second torque producing surface, and external tapered threads; and
  a second end attached to said body opposite said first end, said second end having a first torque producing plane, a second torque producing plane, and internal tapered threads.

5. The system of claim 4, wherein said first end integrates said first transmission element at said second torque producing surface.

6. The system of claim 4, wherein said first end further comprises a first annular recess integrated into said second torque producing surface for receiving said first transmission element.

7. The system of claim 6, wherein said first transmission element is retained in said first annular recess by a press fit.

8. The system of claim 6, wherein said cylindrical body further comprises a first channel having a first opening and a second opening, said first channel substantially extending from said second torque producing surface to said central bore.

9. The system of claim 8, wherein said first opening substantially adjoins said first annular recess.

10. The system of claim 4, wherein said second end integrates said second transmission element at said second torque producing plane.

11. The system of claim 4, wherein said second end further comprises a second annular recess integrated into said second torque producing plane for receiving said second transmission element.

12. The system of claim 11, wherein said second transmission element is retained in said second annular recess by a press fit.

13. The system of claim 11, wherein said cylindrical body further comprises a second channel having a first hole and a second hole, said second channel substantially extending from said second torque producing plane to said central bore.

14. The system of claim 13, wherein said second opening substantially adjoins said second annular recess.

15. The system of claim 4, said cylindrical body further comprising at least one retaining channel at least partially integrated into said outer wall for retaining said cable.

16. The system of claim 15, wherein said cable is retained in said retaining channel by tension.

17. The system of claim 4, wherein said downhole tool is selected from the group consisting of casings, drill pipe, heavy-weight drill pipe, drill collars, drill bit subs, transmission links, reamers, stabilizers, motors, turbines, mud hammers, Jars, Kellys, blow-out preventers, steering subs and drill bits.

18. The system of claim 1, wherein each of said first and said second cables comprises:
  an outer tube;
  a conductive core disposed within said outer tube; and
  a dielectric sheath surrounding said conductive core.

19. The system of claim 18, further comprising a conductive sheath disposed between said outer tube and said dielectric sheath.

20. The system of claim 18, wherein said outer tube comprises rigid metal.

21. The system of claim 20, wherein said outer tube comprises stainless steel.

22. The system of claim 1, wherein each of said first and said second transmission elements further comprise an adhesive disposed between said housing, said trough and said conductive element for retaining said trough and said conductive element in a fixed relationship relative to said housing and for resisting abrasion of said transmission elements.

23. The system of claim 22, wherein said adhesive comprises at least one of silica, aluminum oxide and urethane.

24. The system of claim 1, wherein said ring is steel.

25. The system of claim 1, wherein said trough comprises ferrite.

26. The system of claim 25, wherein said ferrite is segmented.

27. The system of claim 1, wherein said conductive element comprises a loop of wire.

28. The system of claim 27, wherein said wire is copper.

29. The system of claim 27, wherein said wire is silver plated, copper clad steel.

30. The system of claim 27, wherein said wire is insulated.

31. The system of claim 30, wherein said wire is insulated with at least one of high density polyethylene and polymerized tetrafluoroethane.

32. A system for transceiving data between downhole tools located on a drill string, said system comprising:
  a drill string comprising a proximal end, a distal end, and a length;
  a first cable substantially retained by a central bore of said drill string to transmit a signal carrying first information between said proximal end and said distal end over a first portion of said length, said first portion of said length comprising a plurality of downhole tools, wherein said plurality of downhole tools are not configured to convey said signal along their lengths;
  a first transmission element coupled to said first cable to convert said signal to a magnetic field;
  a second transmission element proximate said first transmission element to receive said magnetic field and convert said magnetic field into a second signal carrying said first information;
  a second cable coupled to said second transmission element and substantially retained by a central bore of said drill string to transmit said second signal between said proximal end and said distal end over a second portion of said length, said second portion of said length comprising a plurality of downhole tools, wherein said plurality of downhole tools are not configured to convey said signal along their lengths;
  each of said first and said second transmission elements comprises:
  a housing;
  a magnetically conductive trough disposed within said housing;
  an electrically conductive coil disposed within said trough; and a connector coupled to said cable and to said conductive element and said housing wherein said connector further comprises a first contact and a second contact.

33. The system of claim 32, wherein said first contact adjoins said connector to said conductive element.

34. The system of claim 32, wherein said second contact adjoins said connector to said housing.

35. A data transmission network for transceiving information between downhole tools located on a drill string, the data transmission network comprising:
a first downhole tool having a first proximal end, a first distal end and a first central bore;
a second downhole tool having a second proximal end, a second distal end and a second central bore;
at least one intermediate downhole tool not configured to convey a signal along its length, wherein each said at least one intermediate downhole tool is located intermediate said first downhole tool and said second downhole tool, each said at least one intermediate downhole tool having an intermediate central bore, an intermediate proximal end and an intermediate distal end;
a first cable to transceive a first electrical signal carrying first information between ground level and said first downhole tool, wherein a portion of said first cable is disposed within said first central bore;
a second cable to transceive a second electrical signal carrying said first information between one of said at least one intermediate downhole tool and said second downhole tool, wherein a portion of said second cable is disposed within said intermediate central bore;
a first transmission element mounted proximate said first distal end and coupled to said first cable to transduce said first electrical signal to a magnetic signal; and
a second transmission element mounted proximate said intermediate proximal end and coupled to said second cable to transduce said magnetic signal to said second electrical signal and to transceive said second electrical signal along said second cable wherein each of said first and said second transmission elements comprises:
a housing;
a magnetically conductive trough disposed within said housing;
an electrically conductive coil disposed within said trough; and
a connector coupled to said cable and to at least one of said conductive coil and said housing, said housing further comprises a ring having a substantially U-shaped trough and further comprising circumferential ridges integrated into an outer surface of said ring to facilitate retention of said ring by at least one of said first downhole tool and said second downhole tool.

36. The network of claim 35, wherein each of said first proximal end and said second proximal end further comprises a first torque producing surface, a second torque producing surface, and external tapered threads attached to each of said first and second proximal ends.

37. The network of claim 36, wherein each of said first distal end and said second distal end further comprises a first torque producing plane, a second torque producing plane, and internal tapered threads attached to each of said first and second distal ends.

38. The network of claim 37, wherein at least one of said first and said second proximal ends integrates said first transmission element into at least one of said second torque producing surfaces.

39. The network of claim 37, wherein at least one of said first and said second proximal ends further comprises a first annular recess integrated into said second torque producing surface for receiving said first transmission element.

40. The network of claim 39, wherein said first transmission element is retained in said first annular recess by a press fit.

41. The network of claim 39, wherein said cylindrical body further comprises a first channel having a first opening and a second opening, said first channel substantially extending from said second torque producing surface to said central bore.

42. The network of claim 41, wherein said first opening substantially adjoins said first annular recess.

43. The network of claim 37, wherein at least one of said first and said second distal ends integrates said second transmission element into at least one of said second torque producing planes.

44. The network of claim 37, wherein at least one of said first and said second distal ends further comprises a second annular recess integrated into at least one of said second torque producing planes for receiving said second transmission element.

45. The network of claim 44, wherein said second transmission element is retained in said second annular recess by a press fit.

46. The network of claim 44, wherein said cylindrical body further comprises a second channel having a first hole and a second hole, said second channel substantially extending from said second torque producing plane to said central bore.

47. The network of claim 46, wherein said second opening substantially adjoins said second annular recess.

48. The network of claim 35, said cylindrical body further comprising at least one retaining channel at least partially integrated into an outer wall of the cylindrical body for retaining said cable.

49. The network of claim 48, wherein said cable is retained in said retaining channel by tension.

50. The network of claim 35, wherein each of said first and said second downhole tools is selected from the group consisting of casings, drill pipe, heavy-weight drill pipe, drill collars, drill bit subs, transmission links, reamers, stabilizers, motors, turbines, mud hammers, Jars, Kellys, blow-out preventers, steering subs and drill bits.

51. The network of claim 35, wherein each of said first and said second cables comprises:
an outer tube;
a conductive core disposed within said outer tube; and
a dielectric sheath surrounding said conductive core.

52. The network of claim 51, further comprising a conductive sheath disposed between said outer tube and said dielectric sheath.

53. The network of claim 51, wherein said outer tube comprises rigid metal.

54. The network of claim 53, wherein said outer tube comprises stainless steel.

55. The network of claim 35, wherein each of said first and said second transmission elements further comprises an adhesive disposed between at least two of said housing, said trough and said conductive coil for retaining said trough and said conductive coil in a fixed relationship relative to said housing and for resisting abrasion of said housing, said trough and said conductive coil.

56. The network of claim 55, wherein said adhesive comprises at least one of silica, aluminum oxide and urethane.

57. The network of claim 35, wherein said ring is steel.

58. The network of claim 35, wherein said trough comprises ferrite.

59. The network of claim 58, wherein said ferrite is segmented.

60. The network of claim 35, wherein said conductive coil comprises wire.

61. The conductive coil of claim 60, wherein said wire is copper.

62. The network of claim 60, wherein said wire is silver plated, copper clad steel.

63. The network of claim 60, wherein said wire is insulated.

64. The network of claim 63, wherein said insulation comprises at least one of high density polyethylene and polymerized tetrafluoroethane.

65. A data transmission network for transceiving information between downhole tools located on a drill string, the data transmission network comprising:
- a first downhole tool having a first proximal end, a first distal end and a first central bore;
- a second downhole tool having a second proximal end, a second distal end and a second central bore;
- at least one intermediate downhole tool not configured to convey a signal along its length, wherein each said at least one intermediate downhole tool is located intermediate said first downhole tool and said second downhole tool, each said at least one intermediate downhole tool having an intermediate central bore, an intermediate proximal end and an intermediate distal end;
- a first cable to transceive a first electrical signal carrying first information between ground level and said first downhole tool, wherein a portion of said first cable is disposed within said first central bore;
- a second cable to transceive a second electrical signal carrying said first information between one of said at least one intermediate downhole tool and said second downhole tool, wherein a portion of said second cable is disposed within said intermediate central bore;
- a first transmission element mounted proximate said first distal end and coupled to said first cable to transduce said first electrical signal to a magnetic signal; and
- a second transmission element mounted proximate said intermediate proximal end and coupled to said second cable to transduce said magnetic signal to said second electrical signal and to transceive said second electrical signal along said second cable wherein each of said first and said second transmission elements comprises:
- a housing;
- a magnetically conductive trough disposed within said housing;
- an electrically conductive coil disposed within said trough; and
- a connector coupled to said cable and to said conductive coil and said housing, and wherein said connector further comprises a first contact and a second contact.

66. The network of claim 65, wherein said first contact adjoins said connector to said conductive coil.

67. The network of claim 65, wherein said second contact adjoins said connector to said housing.

* * * * *